(12) United States Patent
Li et al.

(10) Patent No.: US 10,498,226 B2
(45) Date of Patent: *Dec. 3, 2019

(54) DUAL-RECTIFICATION BRIDGE TYPE SINGLE STAGE PFC CONVERTER

(71) Applicant: SHANGHAI TUITUO TECHNOLOGY CO., LTD, Shanghai (CN)

(72) Inventors: Renhong Li, Shanghai (CN); Zhuo Shen, Shanghai (CN)

(73) Assignee: SHANGHAI TUITUO TECHNOLOGY CO., LTD, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,395

(22) Filed: Apr. 24, 2019

(65) Prior Publication Data

US 2019/0326813 A1 Oct. 24, 2019

(30) Foreign Application Priority Data

Apr. 24, 2018 (CN) .......................... 2018 1 0370622

(51) Int. Cl.
*H02M 1/42* (2007.01)
*H02M 3/335* (2006.01)
*H02M 1/00* (2006.01)

(52) U.S. Cl.
CPC ....... *H02M 1/4241* (2013.01); *H02M 1/4258* (2013.01); *H02M 3/335* (2013.01); *H02M 3/33569* (2013.01); *H02M 2001/0009* (2013.01); *H02M 2001/4291* (2013.01)

(58) Field of Classification Search
CPC .. H02M 1/42; H02M 1/44; H02M 2001/0009; H02M 1/4208; H02M 1/425; H02M 1/4258; H02M 3/335; H02M 1/4241; H02M 3/33569; H02M 2001/0058; H02M 1/4233

See application file for complete search history.

(56) References Cited

U.S. PATENT DOCUMENTS

| | | | | |
|---|---|---|---|---|
| 5,119,283 | A * | 6/1992 | Steigerwald | H02M 1/10 323/207 |
| 5,822,198 | A * | 10/1998 | Fraidlin | H02M 1/4258 363/17 |
| 9,502,996 | B2 * | 11/2016 | Cho | F25B 49/025 |
| 2013/0242622 | A1 * | 9/2013 | Peng | H02M 3/33507 363/21.12 |
| 2014/0016368 | A1 * | 1/2014 | Chandrasekaran | H02M 3/156 363/21.12 |

(Continued)

*Primary Examiner* — Fred E Finch, III
*Assistant Examiner* — Rafael O. De León Domenech
(74) *Attorney, Agent, or Firm* — Muncy, Geissler, Olds & Lowe, P.C.

(57) ABSTRACT

A dual-rectification bridge type single stage PFC converter circuit includes a boost circuit working together with a bridge type DC-DC converter. The bridge type DC-DC converter may include low side and high side switching components like BUCK, half bridge, full bridge, etc. This PFC converter circuit drives the boost inductor of the boost circuit by using the switching components of the bridge type DC-DC converter, which eliminates the use of boost switching components and boost rectifiers in conventional boost PFC circuits, also eliminates the use of individual PWM PFC control units.

9 Claims, 12 Drawing Sheets

(56) References Cited

U.S. PATENT DOCUMENTS

| | | | |
|---|---|---|---|
| 2015/0022163 A1* | 1/2015 | Han | H02M 1/4208 |
| | | | 323/205 |
| 2017/0025962 A1* | 1/2017 | Davidson | H02M 1/42 |
| 2017/0133926 A1* | 5/2017 | Lin | H02M 1/4241 |
| 2018/0212545 A1* | 7/2018 | Xu | H02M 3/1582 |
| 2018/0248495 A1* | 8/2018 | Lee | H02M 7/5387 |
| 2019/0029086 A1* | 1/2019 | Wang | G06F 1/263 |
| 2019/0148973 A1* | 5/2019 | Kim | H02J 7/06 |
| | | | 320/109 |

* cited by examiner

DUAL-RECTIFICATION BRIDGE TYPE SINGLE STAGE PFC CONVERTER

CROSS-REFERENCE TO RELATED APPLICATION

This application claims the priority of Chinese patent application number 201810370622.1, filed on Apr. 24, 2018, the entire contents of which are incorporated herein by reference.

TECHNICAL FIELD

The present invention relates to a dual-rectification bridge type single stage PFC (Power Factor Correction) converter, which incorporates a bridge type DC-DC converter containing low side and high side switching components (e.g. BUCK, half bridge, full bridge, etc.). The dual-rectification bridge type single stage PFC converter is capable of boosting input voltage and converting it to stable DC output, to achieve power factor correction function along with the advantages of high efficiency, low cost and less components.

BACKGROUND

Electrical equipment or appliance connected to AC power grid line should satisfy current harmonic standard IEC61000-3-2. With regard to different equipment or applications, IEC61000-3-2 has correspondingly set different current harmonic limits, among which, a Class A limit is for normal electrical equipment, Class B for portable tools and non-professional welding equipment, Class C for lighting equipment, and class D for portable personal computer, monitor and TV.

Existing switching mode power supply technology for realizing power factor correction function, e.g. having the structure as shown in FIG. 1, mainly utilizes passive or active method as introduced below:

| PFC method | Advantages | Disadvantages |
| --- | --- | --- |
| Passive (resistor) | Simple structure, lowest cost. | High loss, heat generated by resistor, low PF. Not suitable for medium or high power converter. Not suitable for Class C, Class D equipment. |
| Passive (inductor) | Simple structure, low cost. | High loss, low PF. Not suitable for medium or high power converter. Not suitable for Class C, Class D equipment. |
| Active (boost) | High PF, low loss. Suitable for low, medium and high power converters. Suitable for Class C, Class D equipment. | Complex circuit structure. More parts. High cost. Large size. |

Among the above, active PFC (Boost) is the best power factor correction method in terms of performance.

As shown in FIG. 2, a conventional converter with active PFC comprises an AC-DC rectification circuit, a boost converter and a DC-DC converter. In the practical example shown in FIG. 3, the DC-DC converter is of the half bridge type, and a full bridge or BUCK converter may also apply.

As shown in FIG. 3, the boost converter and the half bridge DC-DC converter operate independently, and are controlled and driven by individual PWM control units. The operating principle is: first boost switching component Q1, inductor L1, diode D2, capacitor C1 and C2 are constructed as the boost converter:

1) Q1 turns on: rectified input voltage on C1 applied on L1, energy stored in L1;
2) Q1 turns off: induced voltage on L1 and voltage on C1 superimpose to charge C2, voltage on C2 always being higher than input instant voltage, so boost circuit operates.

The duty of Q1 is controlled by PWM control unit which senses and feedbacks PFC output (C2 voltage, normally designed to 380V~400V), and then generates a PWM driving signal by conventional automatic control theory.

The above conventional boost circuit is capable of realizing power factor correction, to meet IEC61000-3-2 requirement, but it has below demerits:

1. Need individual PWM control unit to improve power factor.
2. Need power supply circuit for PFC PWM control circuit.
3. Need independent boost switching components (FETs and diodes) and PFC current sensing resistor R1.
4. Need more PCB space, which is difficult in mechanical and layout design.
5. More components count, high cost.
6. Boost switching component Q1 operates at hard switching mode, results in high loss, poor EMI noise.

SUMMARY OF THE INVENTION

The invention discloses a dual-rectification single stage PFC converter incorporating a bridge type DC-DC converter. It improves efficiency and noise, saves space and cost, becomes an effective solution to compact, low cost, high efficiency, low loss AC-DC converter with power factor correction function.

The dual-rectification bridge type single stage PFC converter of the present invention incorporates a bridge type DC-DC converter and comprises: a first input rectification circuit, a second input rectification circuit, a storage capacitor, a boost converter, a bridge type DC-DC converter, and a feedback control and driving unit, the boost converter comprising a boost capacitor and a boost circuit;

wherein the first input rectification circuit rectifies an input voltage and charges the storage capacitor by forming a first input rectification loop; the second input rectification circuit rectifies the input voltage and charges the boost capacitor by forming a second input rectification loop; one node of the storage capacitor, one node of the boost capacitor and an output of the first input rectification circuit are connected together at a same polarity;

wherein the bridge type DC-DC converter comprises a first bridge arm comprising at least a first switching component and a second switching component;

wherein the bridge type DC-DC converter has a half or a full bridge topology and contains a main transformer, the main transformer including at least one primary winding and at least one secondary winding, the primary winding being driven at least by the first bridge arm, the secondary winding delivering power to an output load through a rectification and filter circuit; or the bridge type DC-DC converter is a BUCK topology and contains a main inductor, the main inductor being driven at least by the first bridge arm and delivering power energy to an output load through a rectification and filter circuit;

wherein the boost circuit comprises a first boost inductor, as well as the first and second switching components of the bridge type DC-DC converter;

wherein during conduction of the first switching component and cut-off of the second switching component, the first boost inductor, the boost capacitor and the first switching component form a first boost loop that charges the first boost inductor by the boost capacitor; during conduction of the second switching component and cut-off of the first switching component, the first boost inductor, the boost capacitor, the second switching component and the storage capacitor form a second boost loop that charges the storage capacitor through a superimposed voltage of an induced voltage on the first boost inductor and a voltage on the boost capacitor;

wherein during conduction of the first switching component and cut-off of the second switching component, the storage capacitor, the primary winding of the main transformer or the main inductor, and the first switching component form a first DC-DC loop; during conduction of the second switching component and cut-off of the first switching component, the primary winding of the main transformer or the main inductor, and the second switching component form a second DC-DC loop;

wherein the feedback control and driving unit senses and feedbacks an output of the bridge type DC-DC converter, generates a chopping signal to control the first and second switching components' conduction and cut-off by comparing with a setting value and according to an automatic control theory, so as to control an output voltage, or current, or power of the bridge type DC-DC converter.

Optionally, the first boost inductor operates at a discontinuous current mode; when the first boost inductor's current is discharged to zero, a resonant loop comprising the storage capacitor, the boost capacitor, the first boost inductor, and the second switching component which is in a turn-on state, generates a resonant current; upon turn-off of the second switching component, the resonant current changes direction to discharge a parasitic capacitor of the first switching component until a zero volt is substantially reached, to enable the first switching component to achieve zero voltage switching (ZVS) at a subsequent turn-on.

Optionally, the dual-rectification bridge type single stage PFC converter circuit further comprises a first boost rectification component connected in series with the first boost inductor.

Optionally, the bridge type DC-DC converter comprises a half bridge circuit or a resonant half bridge circuit containing a resonant inductor and a resonant capacitor.

Optionally, the bridge type DC-DC converter comprises: a full bridge circuit including a second bridge arm having a third switching component and a fourth switching component and a first boost rectification component connected in series with the first boost inductor, the first boost rectification component being a diode or a switching component; or a resonant full bridge circuit comprising a resonant inductor, a resonant capacitor and a second bridge arm containing a third switching component and a fourth switching component.

Optionally, the dual-rectification bridge type single stage PFC converter circuit further comprises a second boost inductor connected in series with the second boost rectification component, both of which being driven by the third switching component; wherein the first boost inductor and the second boost inductor are alternately driven by the first switching component and the third switching component to operate like an interleaved boost converter; wherein the second boost rectification component is a diode or a switching component.

Optionally, the bridge type DC-DC converter is a BUCK converter, and the second switching component is replaced by a rectification component.

Optionally, each of the first input rectification circuit and the second input rectification circuit contains at least a rectification component, the rectification component being either a diode or a switching component; when the rectification components are switching components, the PFC converter circuit further includes an input AC phase monitoring and rectification control unit which monitors a phase of an AC input and controls turn-on and turn-off states of the switching components according to the AC phase.

Optionally, the dual-rectification bridge type single stage PFC converter circuit further comprises an impedance circuit connected in series to the first input rectification loop, to limit an input inrush current upon turn-on of the PFC converter circuit, the impedance circuit not coupled to any of the second input rectification loop, or to the first and second boost loops, or the first and second DC-DC loops.

In an exemplary embodiment (FIG. 3) of the present invention, a boost converter integrated with a bridge type DC-DC converter comprises an AC-DC rectification circuit, a Boost converter and a DC-DC converter containing low side (Q3) and high side (Q2) switching components; the first switching component Q2 is connected to high (positive) voltage node of the first input rectification output which is also serves as the boost output Vdc; a boost inductor L1 and a boost capacitor C1 are connected in series and then connected in parallel to the first switching component Q2; one node of the boost capacitor C1 is connected to the high voltage node of the storage capacitor C2, the other node of C1 is connected to both pole of AC input (L,N) or DC input (+,−) through the boost input rectification diodes D3 and D4.

Operating theory of power factor correction of the present invention is: the first switching component Q2 is not only the high side switching component of the DC-DC converter, but also the main switching component of the boost converter. Under control of feedback PWM or PFM, Q2 drives the boost converter and the DC-DC bridge type converter simultaneously. Its working sequence is as follows: 1) Q2 on, Q3 off: boost inductor L1 is charged by input rectified voltage on C1, energy stored in L1. At same time, Q2 drives DC-DC main transformer T1 to deliver energy to its secondary side. 2) Q2 off, Q3 on: induced voltage on L1 and rectified input voltage on C1 superimpose, through Q3, to charge C2. Therefore, voltage on C2 is always higher than input AC voltage, boost conversion achieved.

The duty of PWM generated by feedback control and driving unit by sensing output parameters like voltage, current or power, controls and stabilizes the DC-DC output. The same PWM also controls the boost converter to convert input voltage to storage capacitor C2 as boost output Vdc. In addition, at same duty of PWM driving signal, boost output Vdc is proportional to adjusted duty of DC-DC PWM, therefore, by feedback control and driving unit, the adjustment of duty of PWM will adjust both boost converter and DC-DC converter in the same control direction, so that the gain of feedback loop can be increased, which enhances ripple and dynamic load response performance.

The invention offers a low cost, less parts count, compact switching mode power supply with power factor correction function. It is capable of attaining current waveform close to sinusoidal shape (FIG. 4), to meet IEC61000-3-2 requirement.

The converter of the present invention takes use of switching components of the bridge type converter to drive the boost inductor, which eliminates the boost switching component and boost rectifier in conventional boost PFC circuit, and also eliminates individual PWM PFC control circuit. As a result, this converter circuit saves cost, saves space, so that low cost, compact, high efficiency power supply is achieved.

LIST OF REFERENCE NUMERALS

Q1 Boost switching component
Q2 First switching component
Q3 Second switching component
Q4 Third switching component in full bridge DC-DC converter
Q5 Fourth switching component in full bridge DC-DC converter
D1 First input rectification component
D2 First boost rectification component
D3 Second input rectification component
D4 Third input rectification component
D5 Second boost rectification component
C1 Boost capacitor
C2 Storage capacitor
T1 Bridge type DC-DC main transformer or main inductor
Np Primary winding
Ns1 First secondary winding
Ns2 Second secondary winding
L1 First boost inductor
L2 Second boost inductor
Rth1 First impedance, inrush current limiter
Lr1 First resonant inductor in resonant DC-DC converter
Cr1 First resonant capacitor in resonant DC-DC converter
Ds1 First output rectification component
Ds2 Second output rectification component
Cs1 First output smoothing capacitor
Ls1 First output smoothing inductor
Vdc Boost converter output voltage, voltage on storage capacitor

DETAILED DESCRIPTION OF EXEMPLARY EMBODIMENTS

The present invention discloses a simple, low-cost, compact switching mode power supply (SMPS) solution with active power factor correction function. The SMPS solution integrates a boost converter and a bridge type DC-DC converter which contains low side and high side switching components like BUCK, half bridge, full bridge, etc., so that the converters cooperate to boost the input voltage and then convert it to a stable DC output. When applied to an AC input power supply, the SMPS solution can also fulfill power factor correction function.

The circuit is configured such that: the boost converter makes use of the switching components of the bridge type DC-DC converter to drive the boost inductor, which eliminates the use of boost switching component, boost rectifier and individual PWM PFC control units that are required in conventional boost circuits. Furthermore, the boost inductor is designed to operate in a discontinuous mode, which enables the switching components of the bridge type converter to operate at ZVS (Zero Voltage Switch) state to reduce switching loss. Embedding two input rectification circuits make it possible to allocate the inrush current limiter at a position where inrush current inhibition is needed at converter turn-on, but has no loss during the subsequent normal operation. As a result, this circuit saves cost, saves space, increases efficiency and removes heat from converter so that a low-cost, compact, high-efficiency power supply is achieved.

First Embodiment

Figure 1:
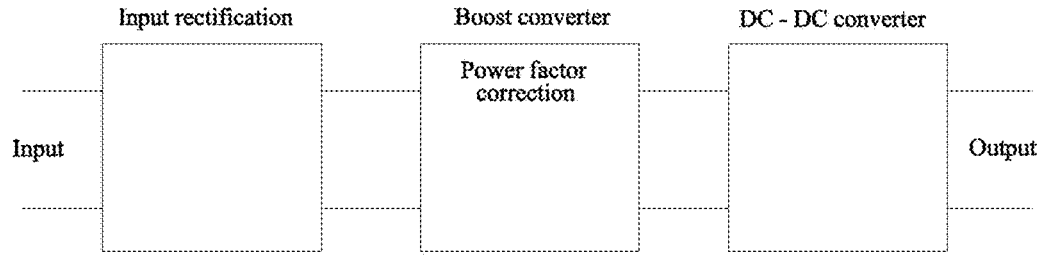
FIG. 1 shows a conventional switching mode power supply which includes a PFC boost converter.
Figure 2:
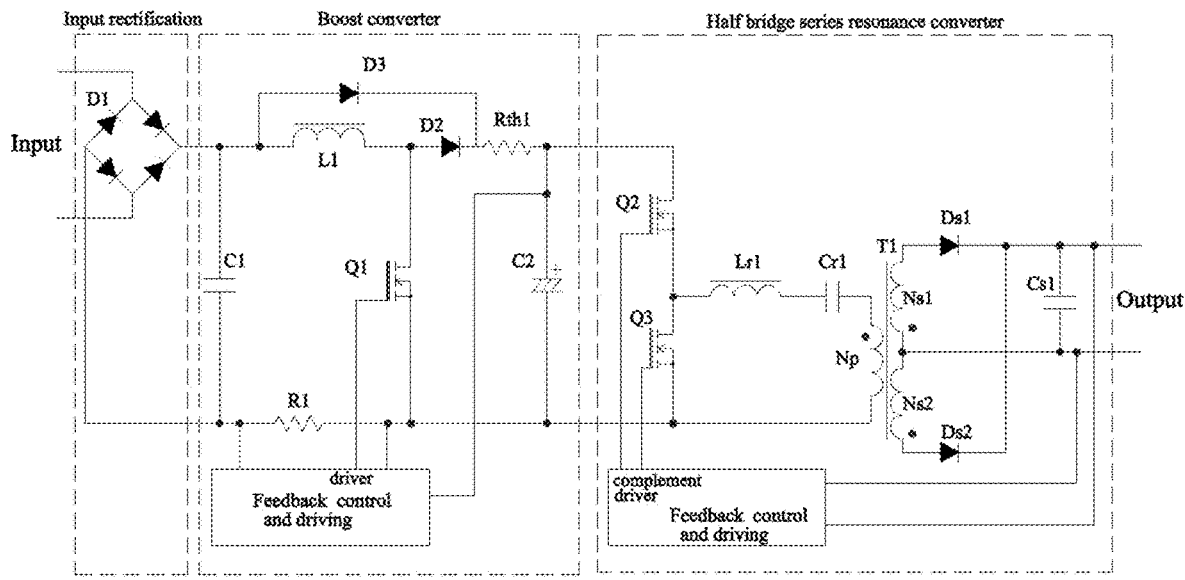
FIG. 2 shows a conventional switching mode power supply which includes a PFC boost converter and a half bridge DC-DC converter.
Figure 3:
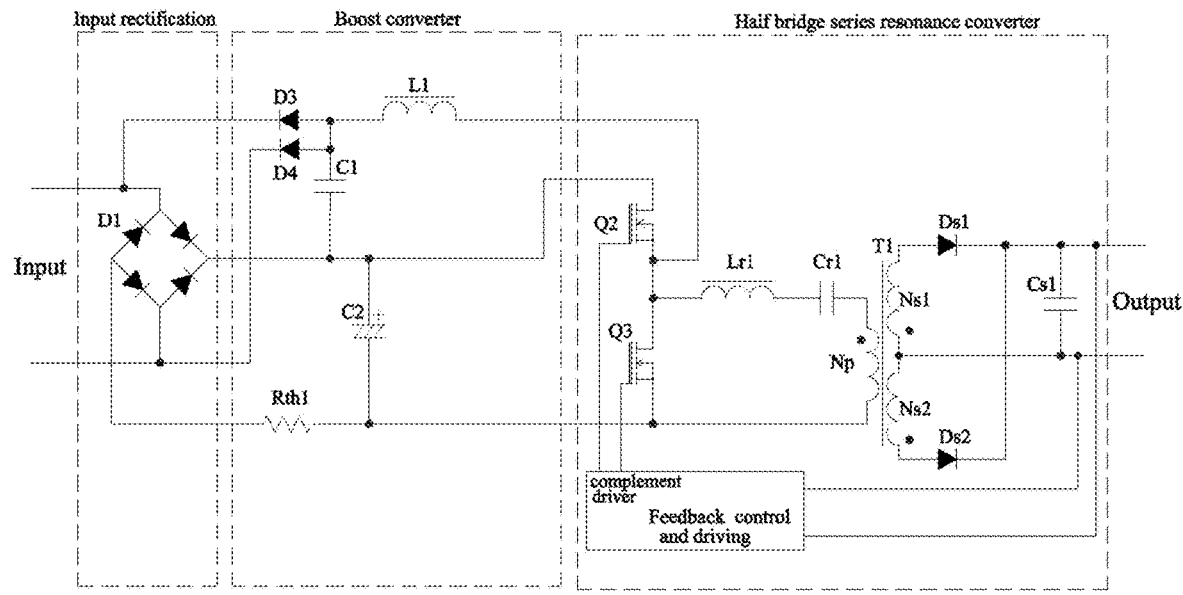
FIG. 3 shows an embodiment of the present invention which includes a PFC boost converter and a half bridge DC-DC converter.
Figure 4:
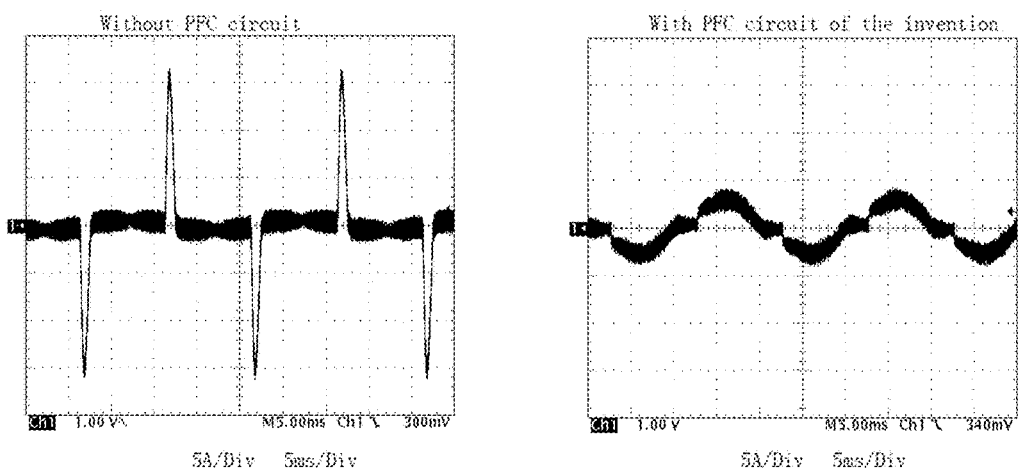
FIG. 4 shows the comparison results between a power supply without PFC and a power supply according to the present invention.
Figure 5A:
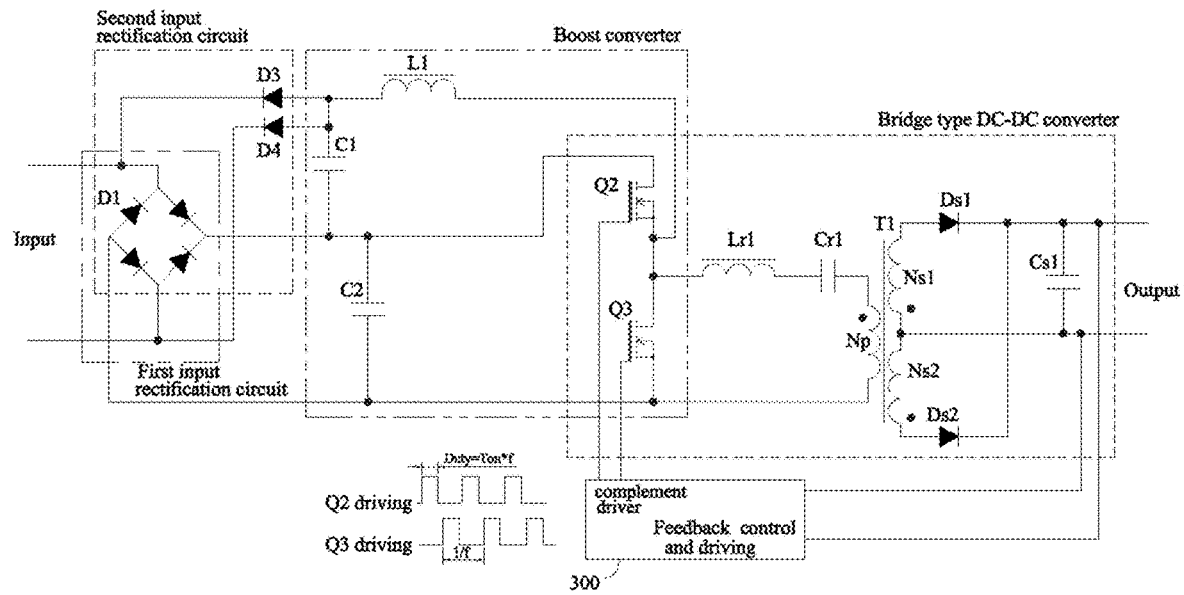
FIG. 5a is a schematic of the first embodiment with two input rectification circuits coupled at positive node.
Figure 5B:
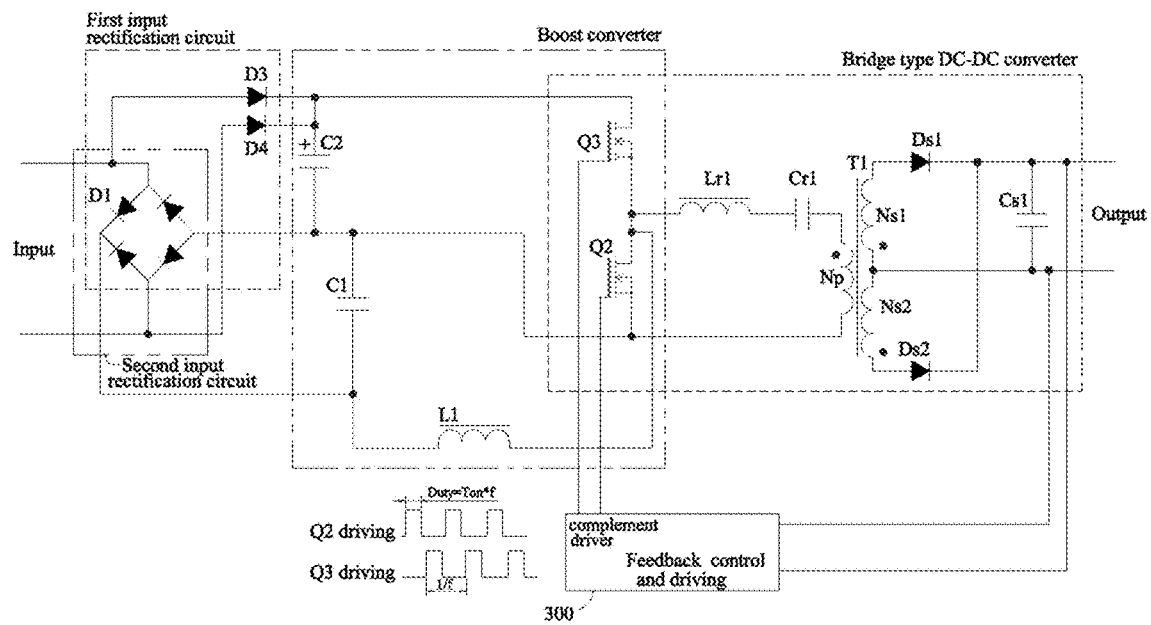
FIG. 5b is a schematic of the first embodiment with two input rectification circuits coupled at negative node.

The first embodiment is shown in FIGS. 5a and 5b.

The power supply shown in FIG. 5a is a combination of a boost converter and an asymmetrical half bridge DC-DC converter. The power supply comprises: two input rectification circuit, a boost converter and a half bridge DC-DC converter. First switching component Q2 and second switching component Q3 constitute a bridge arm of the half bridge converter. Q2 connects to a high voltage node of a storage capacitor C2. Q2 and Q3 drive the primary winding of the main transformer T1 in an alternate manner. Boost inductor L1 and boost capacitor C1 are connected in series and then connected in parallel with Q2. One node of the boost capacitor C1 is connected to a high voltage node of the input rectification circuit as well as the positive node of storage capacitor C2. The other node of the boost capacitor C1 is coupled to the input poles through input rectification components D3 and D4 respectively.

Circuit Details:

First part: two input rectification circuits.

1) First input rectification circuit includes input rectification component, i.e. bridge diode D1. The first input rectification circuit rectifies input voltage in full wave mode, and stores energy in storage capacitor C2. When boost circuit operates after power supply's turn-on, boost output voltage on C2 is always higher than instant voltage of AC input, thus AC input no longer charges C2. When the output power of the boost circuit is insufficient to maintain C2 voltage higher than instant AC voltage, AC input starts charging C2 again;

2) Second input rectification circuit includes bridge diode D1 as well as a second and a third input rectification component D3 and D4. The rectification circuit charges boost capacitor C1. Due to relatively small capacitance of C1, voltage on C1 reflects full wave rectification waveform of input AC. In active PFC (boost) circuit, boost capacitor C1 is provided for the purpose of high frequency noise reduction and improvement of EMI.

Second part: a combination of boost converter and asymmetrical half bridge DC-DC converter.

Primary circuit includes storage capacitor C2, first switching component Q2, second switching component Q3, resonant inductor Lr1, resonant capacitor Cr1 and main transformer T1. Secondary circuit includes rectification components Ds1, Ds2, filter Cs1, working with feedback control and driving unit 300 to construct an asymmetrical half bridge DC-DC converter. On the other side, first switching component Q2, boost inductor L1, boost capacitor C1, second switching component Q3 and storage capacitor C2 form a boost converter.

Figure 6:
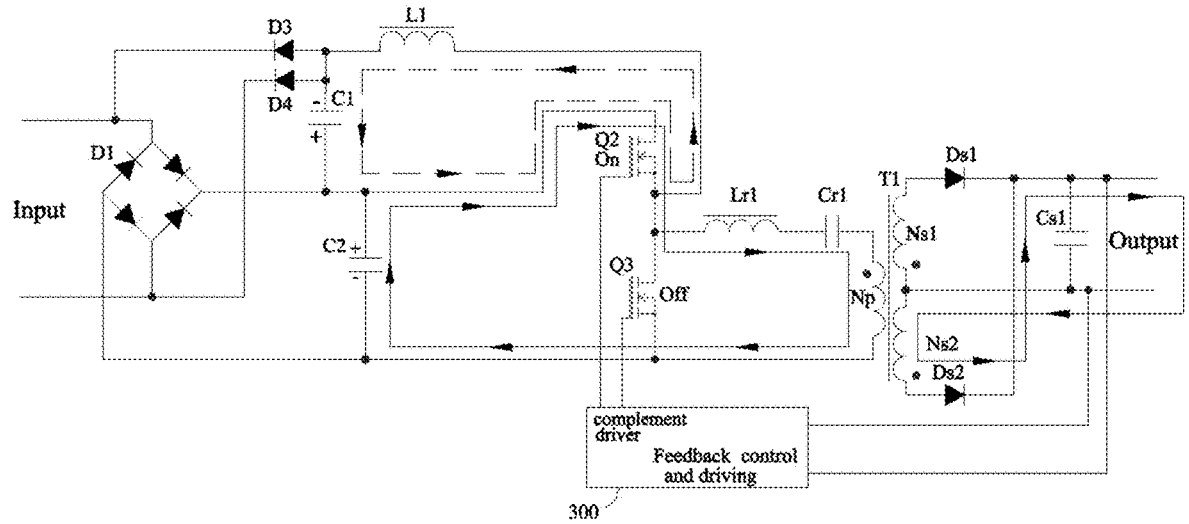
FIG. 6 is a current loop diagram in operating state 1 of the first embodiment.

Operation sequence is as below:

State 1: as shown in FIG. 6, switching component Q2 turns on, Q3 turns off

Voltage on C1 reflects instant input AC voltage after rectification. Voltage on storage capacitor C2 serves as output of boost converter Vdc.

When Q2 conducts, energy in storage capacitor C2 flows in primary winding (Np) of T1, transfers to secondary winding Ns2, delivers power energy to load through output rectification component Ds2 and filter Cs1.

Simultaneously, energy on C1, flows through switching component Q2 into first boost inductor L1 as indicated by dotted line with arrow, so that the boost energy is stored in L1.

Figure 7:
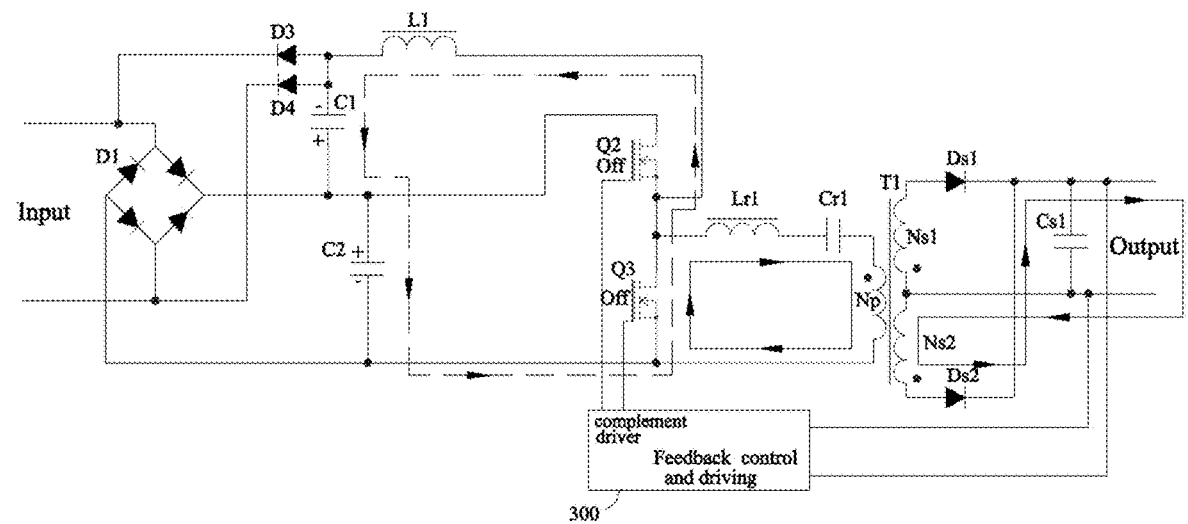
FIG. 7 is a current loop diagram in operating state 2 of the first embodiment.

State 2: as shown in FIG. 7, switching component Q2 turns off, Q3 keeps turn-off After Q2 turns off, resonant tank constructed by Lr1, Cr1 continue to drive T1, Cr1 is continued to be charged, energy continues to deliver to output load.

Simultaneously, energy stored in boost inductor L1, right after Q2's turn-off, generates induced voltage, accumulating with voltage on boost capacitor C1, to charge storage capacitor C2 through second switching component Q3, to accomplish boost conversion. Parasitic capacitor of Q3 is reversely discharged to form zero voltage for ZVS at next state 3-1. Energy in L1 is fully discharged to operate in a discontinuous current mode.

Figure 8:
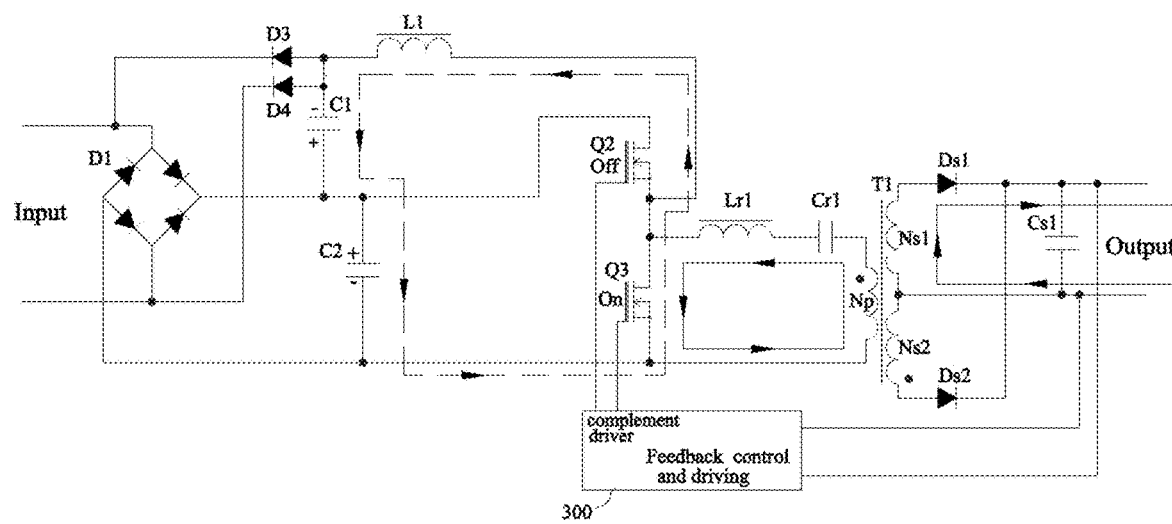
FIG. 8 is a current loop diagram in operating state 3-1 of first embodiment.

State 3-1: as shown in FIG. 8, switching component Q2 keeps turn-off, Q3 turns on.

Boost inductor L1 continues releasing energy. The induced voltage of boost inductor L1 and the voltage on boost capacitor C1 superimpose to charge storage capacitor C2 till L1's stored energy is fully discharged.

When Q3 conducts and resonant current in Lr1 and Cr1 reverses, energy on Cr1 passes through Q3 and Lr1, and flows into primary winding Np of transformer T1. This half bridge converter, converts energy through isolated main transformer T1, from the primary side to the secondary side. The converted energy is further rectified by Ds1, filtered by Cr1, and delivered to output load.

Figure 9:
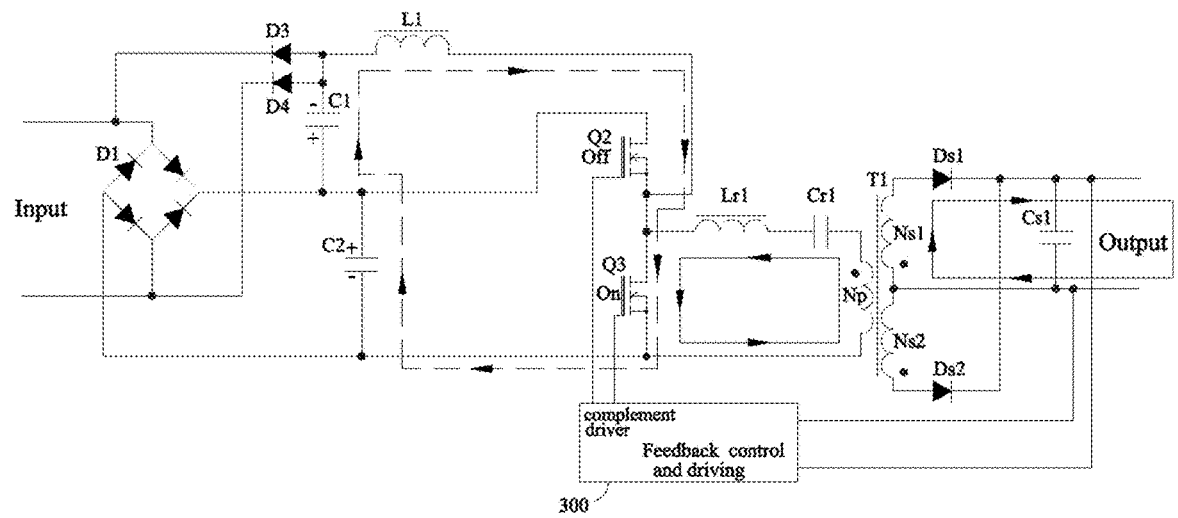
FIG. 9 is a current loop diagram in operating state 3-2 of the first embodiment.

State 3-2: as shown in FIG. 9, switching component Q2 keeps turn-off, Q3 keeps turn-on.

After energy in L1 is completely discharged, energy in storage capacitor C2 starts to charge C1 and L1, through second switching component Q3. Boost capacitor C1 and boost inductor L1 serve as series resonant tank.

Lr and Cr1's resonant current continues to deliver energy to secondary side load through transformer T1.

In the case of boost inductor designed to operate in continuous current mode, this state 3-2 is skipped and the operation enters into state 4 directly. However, due to no resonance existence, first switching component operates in hard switching mode.

Figure 10:
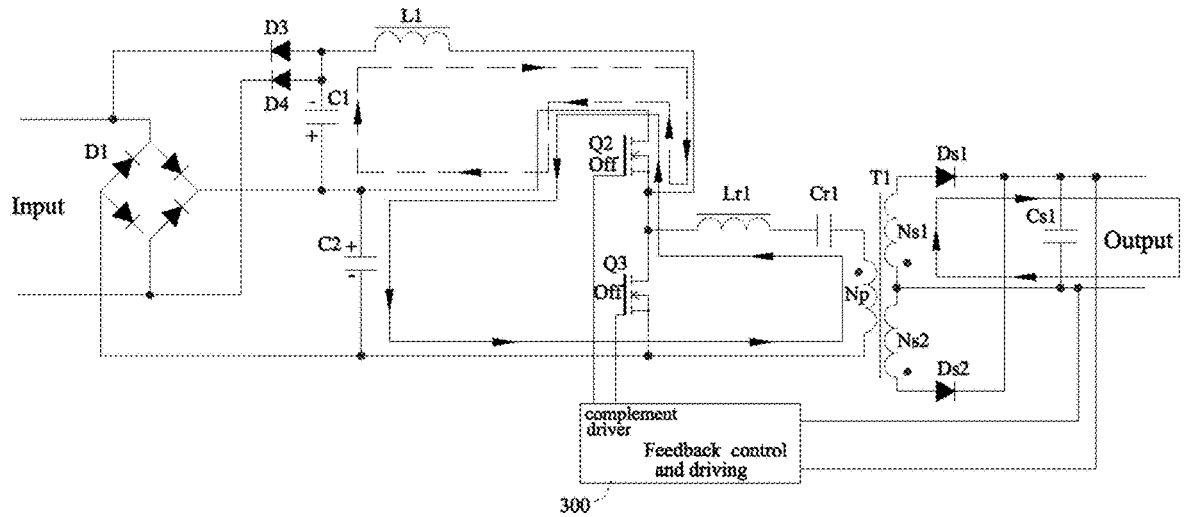
FIG. 10 is a current loop diagram in operating state 4 of the first embodiment.

State 4: as shown in FIG. 10, switching component Q2 keeps turn-off, Q3 turns off.

When Q3 turns off, resonant current in boost inductor L1, through body diode of Q2, discharges Q2's parasitic capacitor, to form zero voltage for ZVS at next state 1.

By controlling elapse time between boost inductor current down to zero and Q3's turn-off, ZVS performance can be optimized.

DC-DC resonant bridge operation principle is same as conventional asymmetrical half bridge, with its first switching component and second switching component operating at ZVS state, thus efficiency is improved. Furthermore, the ZVS of switching components are achieved by boost converter while not relying on the asymmetrical bridge converter, so that ZVS at light load condition will have better performance than conventional asymmetrical half bridge converter.

Figure 11:
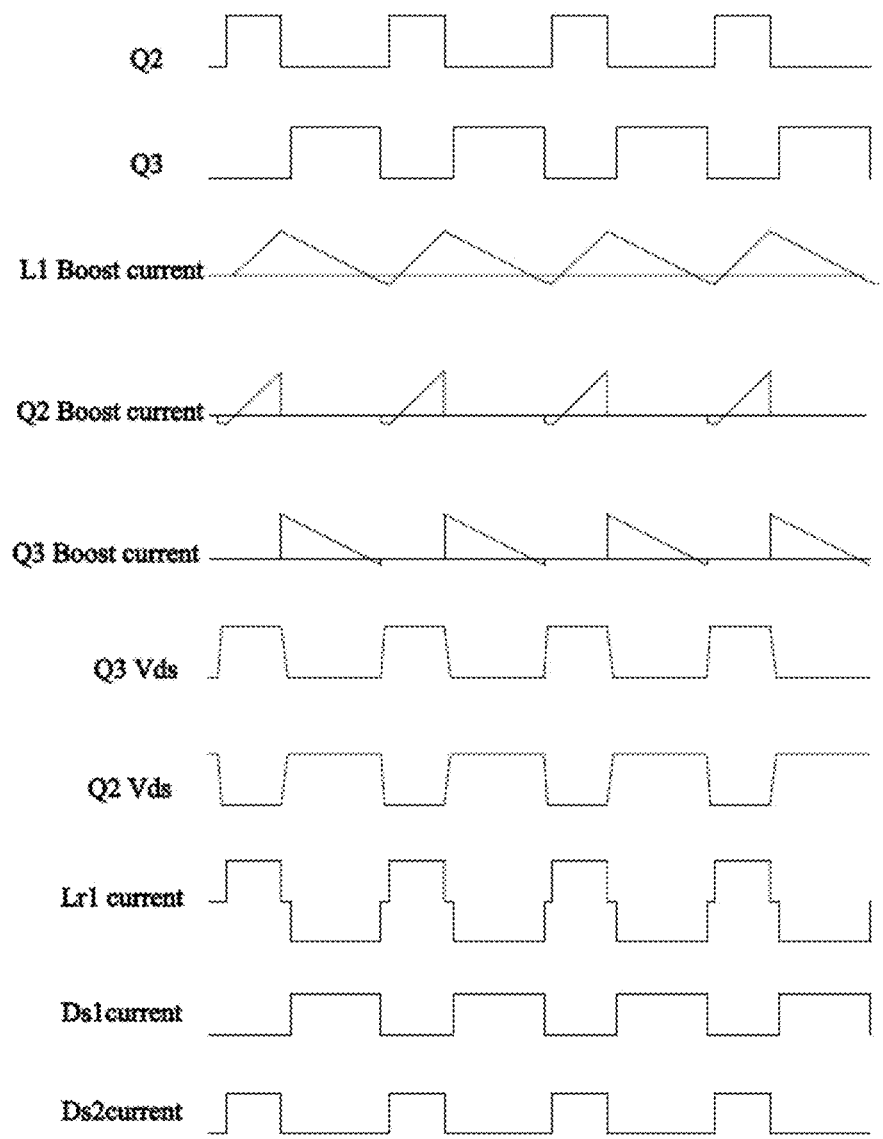
FIG. 11 is an operating waveform diagram according to the first embodiment.

Operation waveforms from state 1 to state 4 are shown in FIG. 11.

Boost inductor L1 and boost capacitor C1, along with first switching component Q2's on-off operation, are in phase with AC input's voltage, thereby absorbing energy from AC power grid, making AC input current synchronized with AC input voltage. As a result, power factor correction function is realized.

FIG. 5b is another example of first embodiment. FIG. 5b differs from FIG. 5a in that the two input rectification circuits are connected at negative nodes. The first switching component Q2 lies at low side, to drive boost inductor L1. Operation sequence is same as above state 1~4.

Second Embodiment

Figure 12:
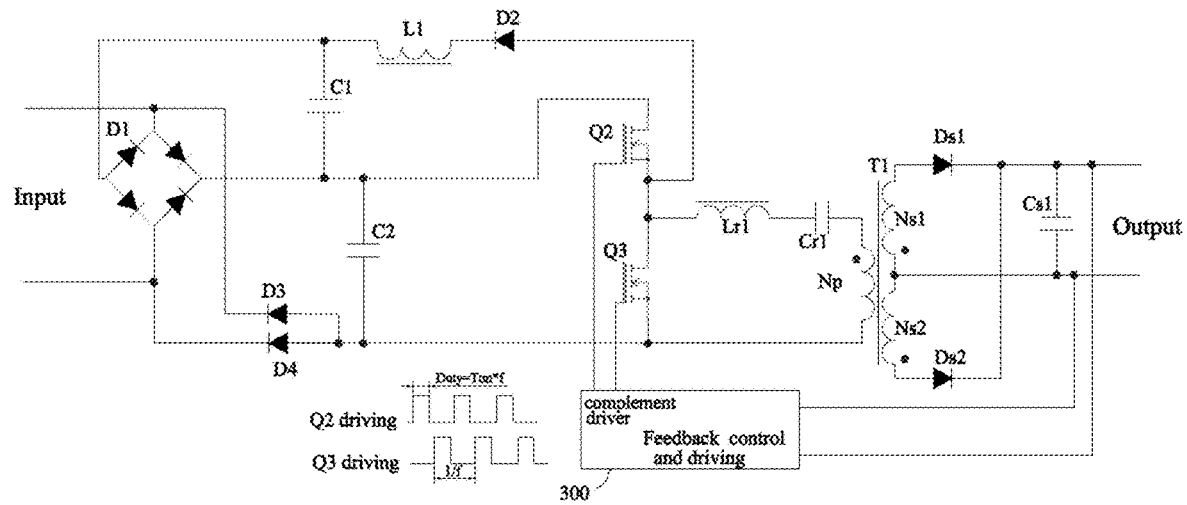
FIG. 12 is a schematic of a second embodiment of the present invention.

The second embodiment of the present invention is shown in FIG. 12. The differences between the second and first embodiments are:

There is a boost rectification component D2 in series connection with boost inductor L1 and boost capacitor C1.

Due to D2 blocks the resonant current described in the first embodiment in discontinuous mode, so the first switching component's ZVS realization relies on the resonance of asymmetrical half bridge instead of the boost converter.

When boost inductor L1 operates in continuous current mode, operating principle will be same as CCM mode in the first embodiment, Q2 works in hard switching mode and Q3 works in ZVS mode. When boost inductor L1 operates in discontinuous current mode, both Q2 and Q3 can operate in ZVS soft switching mode depending on resonance of asymmetrical half bridge converter.

Circuit Structure:

First part: two input rectification circuits.

Its differences to the first embodiment are: D1 changes to charge C1; D1 and D3, D4 charge C2. Because the charging to storage capacitor C2 by input rectification circuit only happens at the turn-on of the power supply, the input rectification components will not suffer from continuous stress on temperature, loss and current rating. By appropriate selection of input rectification components, cost could be reduced, structure and heat dissipation could be optimized.

Second part: a combination of boost converter and half bridge DC-DC converter. Primary side components include storage capacitor C2, low side and high side switching components Q2, Q3, resonant capacitor Cr1 and resonant inductor Lr1, main transformer T1; and secondary side components include diodes Ds1, Ds2, filter Cs1 and feedback control and driving unit 300, which constitute an asymmetrical half bridge converter; switching components Q2, Q3, boost inductor L1, boost capacitor C1, boost rectification component D2 and storage capacitor C2 constitute boost converter.

Figure 13:
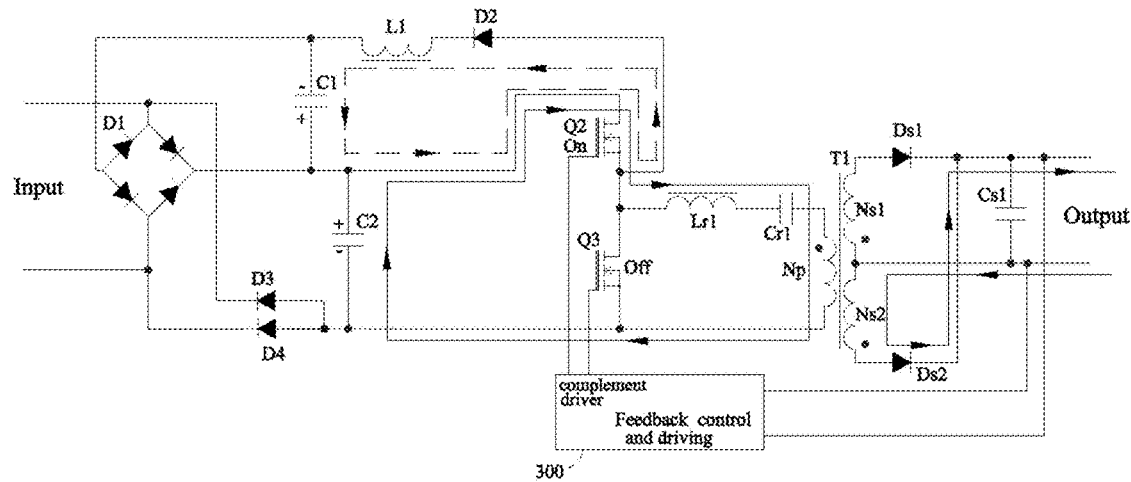
FIG. 13 is a current loop diagram in operating state 1 of the second embodiment.

Operating Principle:

State 1: as shown in FIG. 13, switching component Q2 turns on, Q3 turns off.

Voltage on C1 reflects instant input AC voltage after rectification. Voltage on C2 serves as output of boost converter.

When Q2 conducts, energy in storage capacitor C2 flows in primary winding (Np) of T1, transfers to secondary winding Ns2, delivers power energy to load through output rectification component Ds2 and filter Cs1.

Simultaneously, voltage on storage capacitor C2 also serves as boost output voltage. Voltage on boost capacitor C1 reflects AC input instant voltage after rectification. When energy on C1 flows into first boost inductor L1 through switching component Q2 and boost rectification component D2 as indicated by dotted line with arrow, boost energy is stored in L1.

Figure 14:
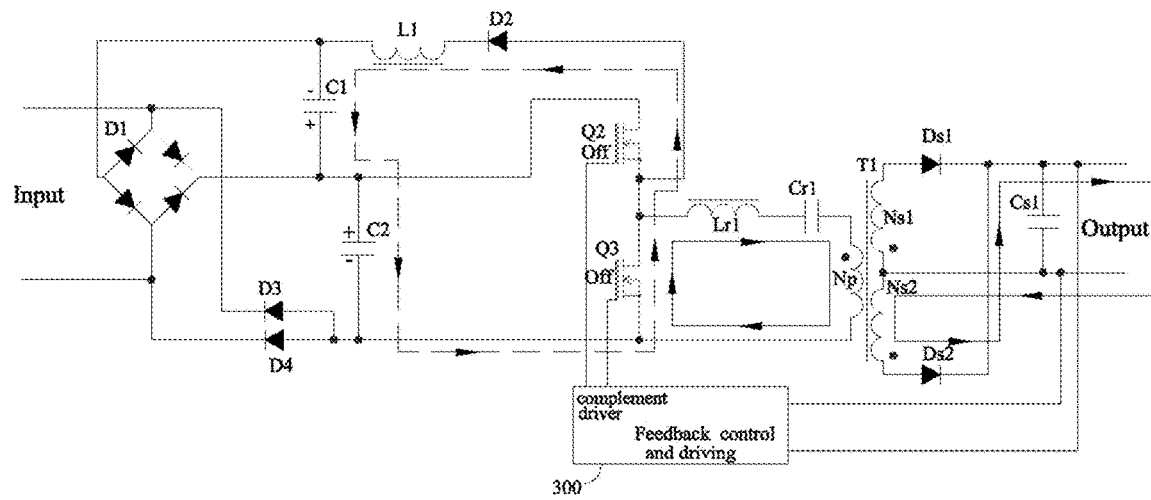
FIG. 14 is a current loop diagram in operating state 2 of the second embodiment.

State 2: as shown in FIG. 14, switching component Q2 turns off, Q3 keeps turn-off After Q2 turns off, resonant tank constructed by Lr1, Cr1 continues to drive T1, Cr1 is continued to be charged, energy continues to be delivered to output load.

Simultaneously, energy stored in boost inductor L1 generates, right after Q2's turn-off, induced voltage. The induced voltage accumulates with voltage on boost capacitor C1, to charge storage capacitor C2 through second switching component Q3, accomplishing boost conversion. Parasitic capacitor of Q3 is reversely discharged to form zero voltage for ZVS transition at next state 3-1. Energy in L1 is fully discharged to operate as discontinuous current mode.

Figure 15:
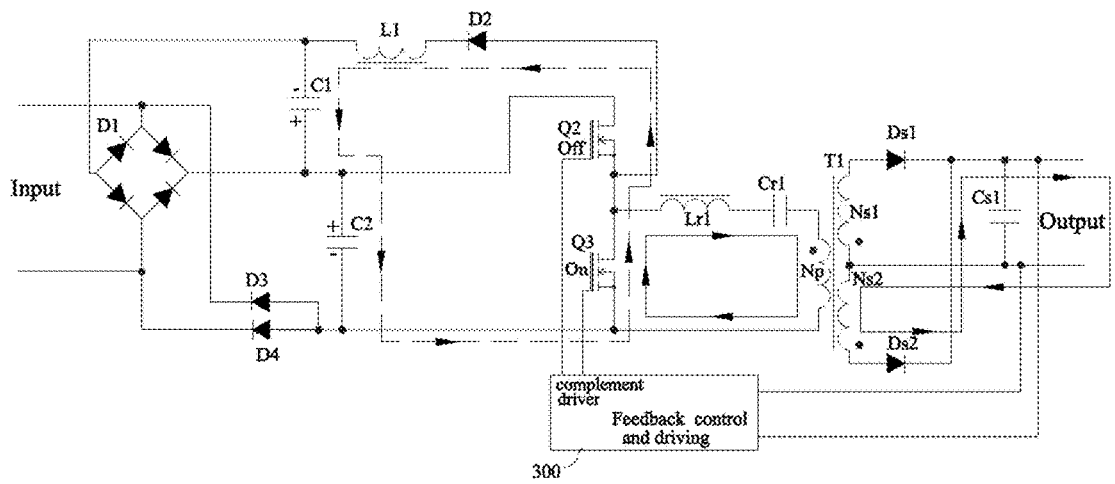
FIG. 15 is a current loop diagram in operating state 3-1 of the second embodiment.

State 3-1: as shown in FIG. 15, switching component Q2 keeps turn-off, Q3 turns on.

Boost inductor L1 continues releasing energy. The induced voltage of L1 and voltage on boost capacitor C1 superimpose to charge storage capacitor C2 till L1's stored energy is fully discharged (DCM) or not fully discharged (CCM) before next state 1.

When Q3 conducts, resonant current in Lr1 and Cr1 tank passes through Q3, and flows into primary winding Np of transformer T1. This half bridge converter, through isolated main transformer T1, converts energy from primary side to secondary side, further rectified by Ds1, filtered by Cr1, to deliver power to output load.

Figure 16:
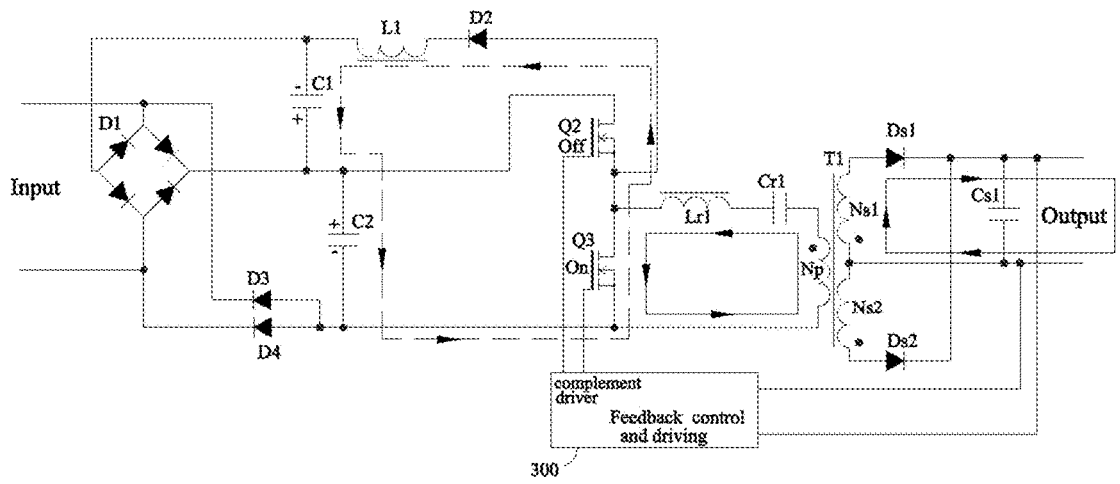
FIG. 16 is a current loop diagram in operating state 3-2 of the second embodiment.

State 3-2: as shown in FIG. 16, switching component Q2 keeps turn-off, Q3 keeps turn-on.

Boost inductor L1 continues releasing energy. The induced voltage of L1 and voltage on boost capacitor C1 superimpose to charge storage capacitor C2 till L1's stored energy is fully discharged (DCM) or not fully discharged (CCM) before next state 1.

Resonant current in Lr1, Cr1 reverses, energy on Cr1 passes through Q3 and Lr1, and flows into primary winding Np of transformer T1. This half bridge converter, through isolated main transformer T1, converts energy from primary to secondary, and the power is further rectified by Ds1, filtered by Cr1, and is delivered to output load.

Figure 17:
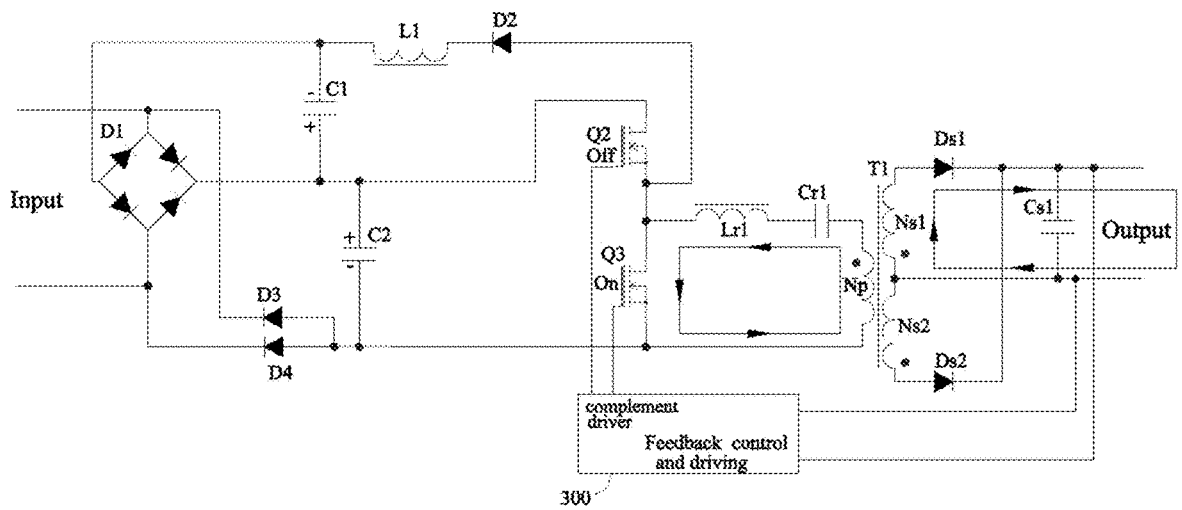
FIG. 17 is a current loop diagram in operating state 3-3 of the second embodiment.

State 3-3: as shown in FIG. 17, switching component Q2 keeps turn-off, Q3 keeps turn-on.

Energy in L1 is fully discharged, and boost current returns to zero volt.

Resonant current in Lr1, Cr1 continues to pass through Q3 and Lr1, and to flow into primary winding Np of transformer T1. This half bridge converter, through isolated main transformer T1, converts energy from primary to secondary.

Figure 18:
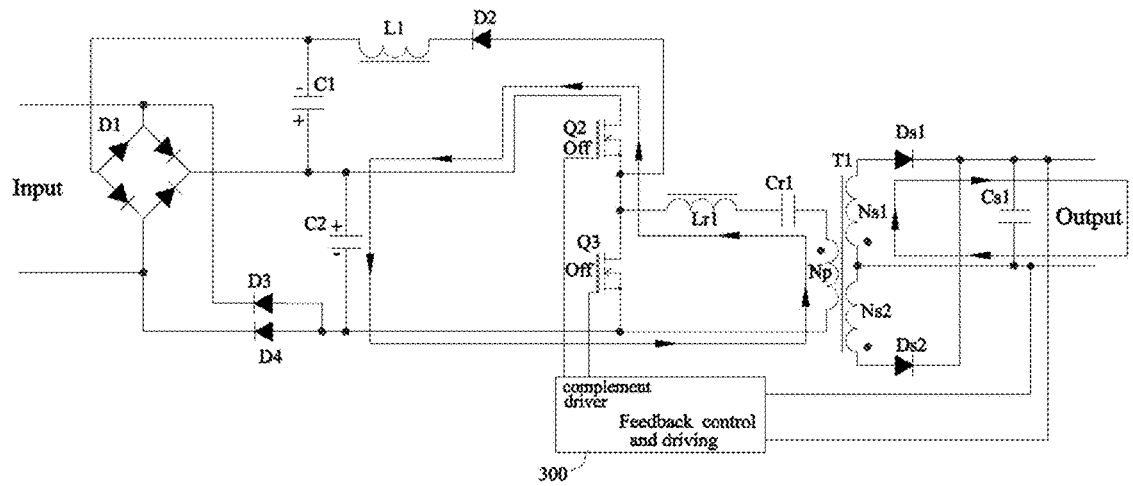
FIG. 18 is a current loop diagram in operating state 4 of the second embodiment.

State 4: as shown in FIG. 18, switching component Q2 keeps turn-off, Q3 turns off.

When Q3 turns off, resonant current in Lr1, Cr1, through body diode of Q2, flows into C1. Parasitic capacitor of first switching component Q2 is reversely discharged by resonant current to form zero voltage, preparing ZVS transition in next cycle's state 1.

Above operating states 1 to 4 repeat to realize resonant boost and half bridge power conversion.

In the case of boost inductor designed to operate in continuous current mode, states 3-2 and 3-3 are skipped and the operation enters into state 4 directly. However, at state 4, resonant current goes through L1 path instead of discharging parasitic capacitor of Q2. First switching component Q2 operates in hard switching mode.

Third Embodiment

Figure 19:
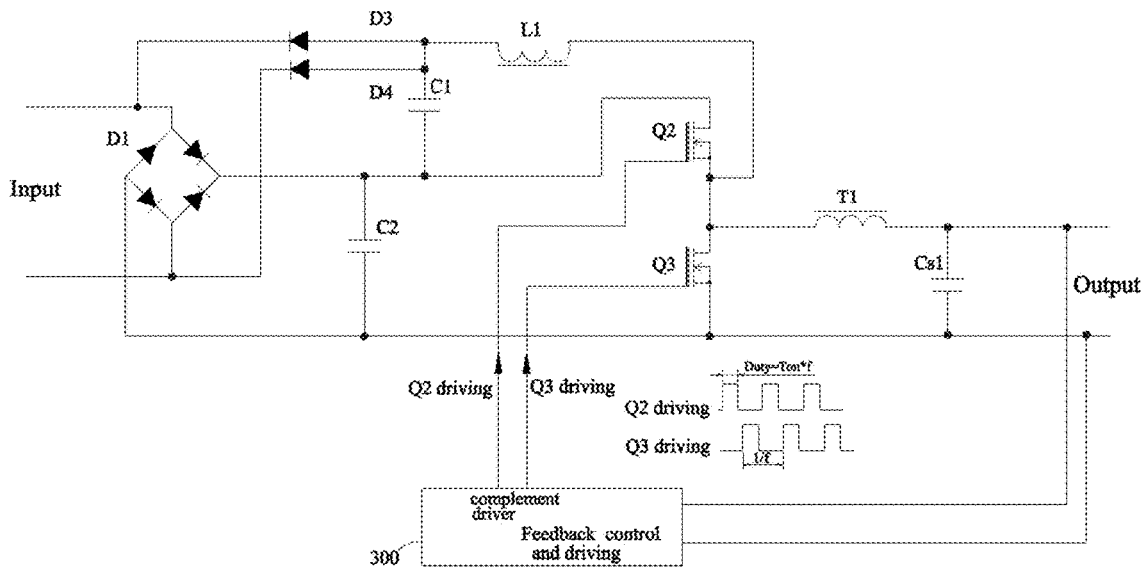
FIG. 19 is a schematic of a third embodiment of the present invention.

As shown in FIG. 19, the difference between the third and first embodiments is: bridge type DC-DC converter is replaced by a BUCK converter.

The operating principles of the two input rectification circuits and boost converter are same as the first embodiment.

Buck converter operates as follows: when Q2 conducts and Q3 cuts off, C2, Q2, T1, Cs1 form the first DC-DC loop, and main inductor T1 stores energy; when Q2 cuts off and Q3 conducts, T1, Cs1 and Q3 form the second DC-DC loop, and T1's stored energy releases to load.

The second switching component Q3 can be replaced by rectification component like diode, the purpose of which remains same for boost current rectification. It is also a traditional form of the BUCK converter.

Fourth Embodiment

Figure 20:
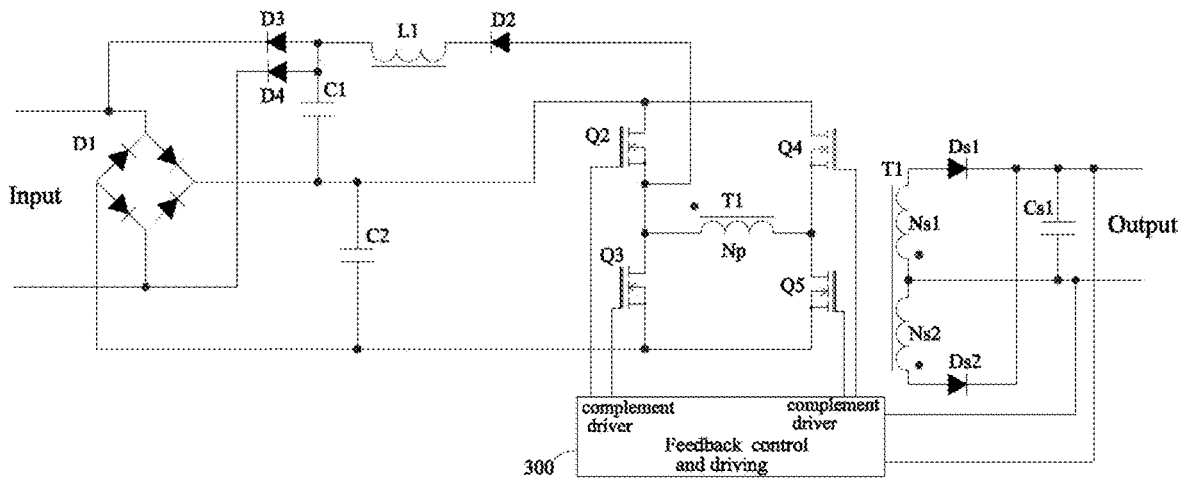
FIG. 20 is a schematic of a fourth embodiment of the present invention.

The fourth embodiment of the present invention is shown in FIG. 20. The difference between the fourth and second embodiments is: the bridge type DC-DC converter is replaced by a full bridge converter.

Boost converter operating principle is same as the second embodiment. The first switching component Q2 drives both boost inductor and main transformer T1 in full bridge converter. Full bridge DC-DC converter operates as follows to achieve its convention: Q2, Q5 and Q3, Q4 turn on and turn off alternatively.

Fifth Embodiment

Figure 21:
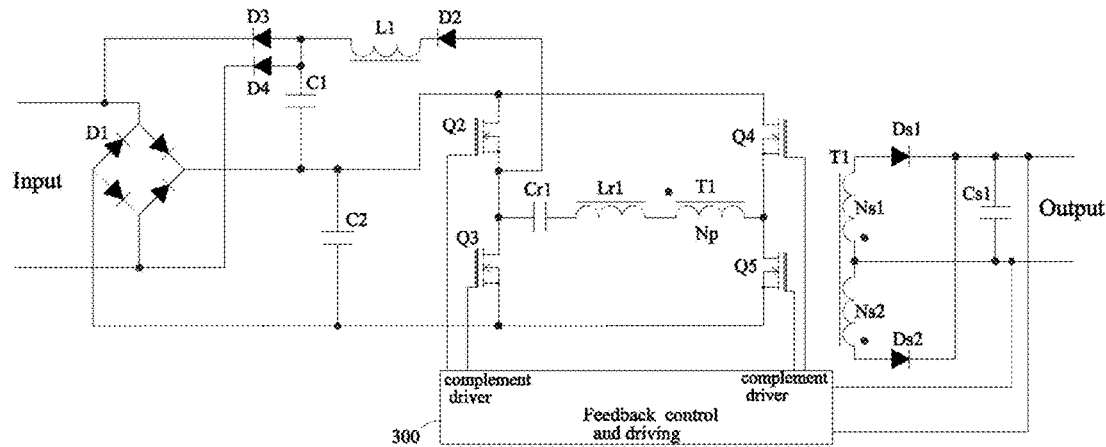
FIG. 21 is a schematic of a fifth embodiment of the present invention.

The fifth embodiment of the present invention is shown in FIG. 21. The differences between the fifth and second embodiments are: the bridge type DC-DC converter is replaced by a resonant full bridge converter, Lr1 serves as resonant inductor and Cr1 serves as resonant capacitor.

Boost converter operates in the same way as in the first embodiment. DC-DC converter follows the operation of a conventional series resonant full bridge converter. The first switching component Q2 drives both boost inductor and main transformer T1 in full bridge converter.

Sixth Embodiment

Figure 22:
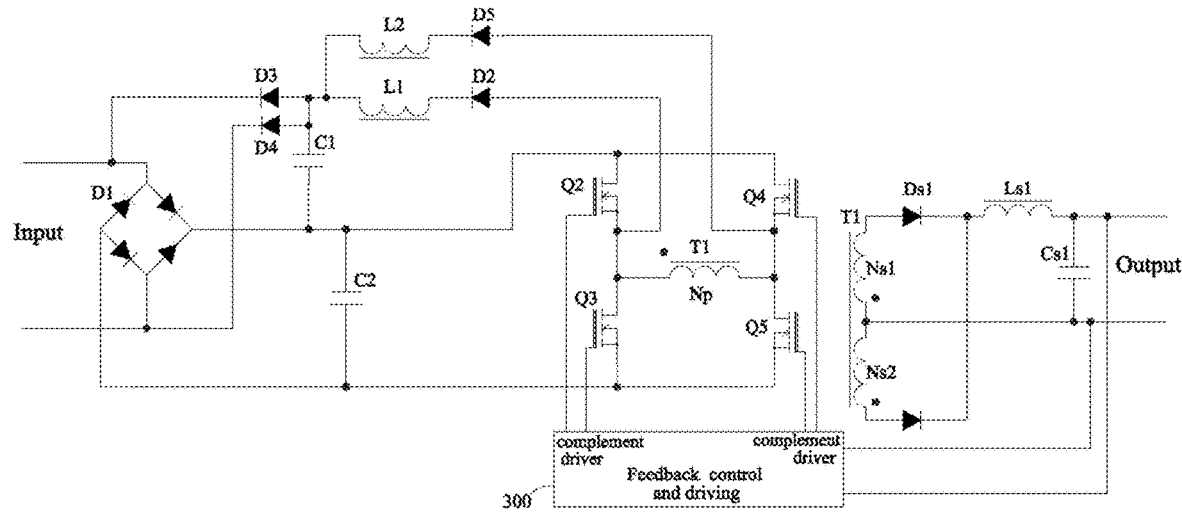
FIG. 22 is a schematic of a sixth embodiment of the present invention.

The sixth embodiment of the present invention is shown in FIG. 22. The differences between the sixth and fourth embodiments are: the first switching component Q2 and the third switching component Q4, through D2 and D5 respectively, drive two channels of boost inductors L1 and L2. Because Q2 and Q4 switch alternately, so that two channels of boost loop form interleaved boost converter. Interleaved boost converter can increase delivered power and reduce boost output ripple.

Seventh Embodiment

Figure 23:
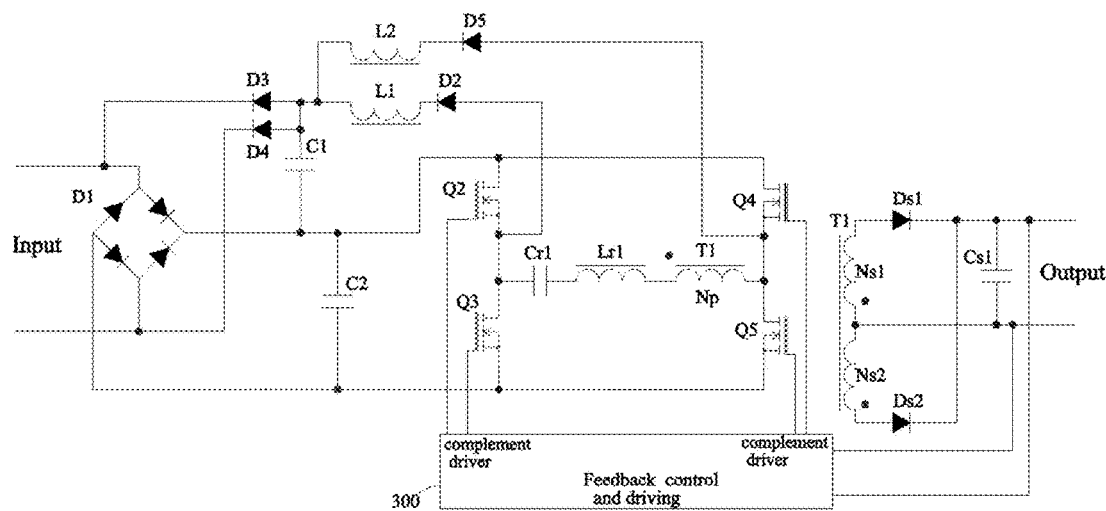
FIG. 23 is a schematic of a seventh embodiment of the present invention.

The seventh embodiment of the present invention is shown in FIG. 23. The differences between the seventh and sixth embodiments are: the bridge type DC-DC converter is replaced by a resonant full bridge converter, Lr1 serves as resonant inductor and Cr1 serves as resonant capacitor.

Eighth Embodiment

Figure 24:
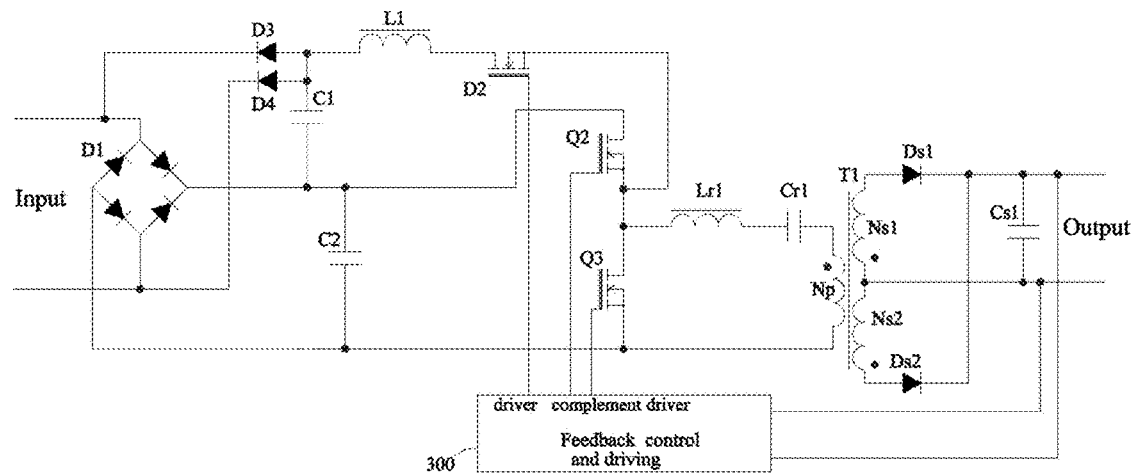
FIG. 24 is a schematic of an eighth embodiment of the present invention.

As shown in FIG. 24, the difference between the eighth and second embodiments is: boost rectification component D2 which is connected in series with boost inductor L1 and boost capacitor C1 is replaced by a switching component Q1. Its operating principle is same as the second embodiment.

When adopting current switching component technology, thanks to its continued efforts in improvement of conducting resistance, a much lower on-state loss performance than rectification component can be achieved. Therefore, rectification component is usually substituted with switching component in medium- or low-power applications to improve efficiency.

Ninth Embodiment

Figure 25:
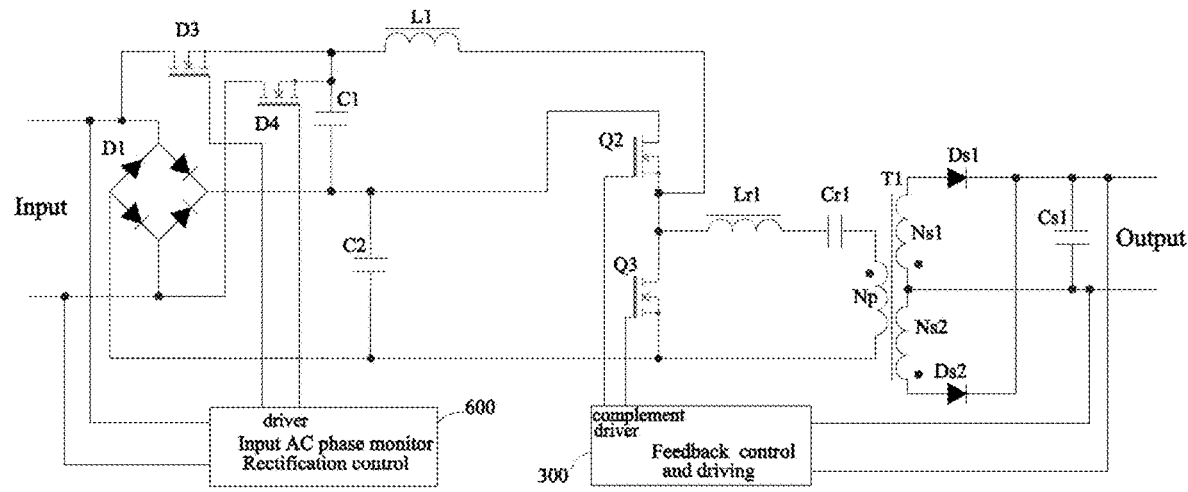
FIG. 25 is a schematic of a ninth embodiment of the present invention.

As shown in FIG. 25, the difference of the ninth embodiment from the first embodiment is: input rectification components D3, D4 are replaced by switching components. Switching components could be MOSFET, IGBT, GaN FET, SiC FET, etc. Benefiting from switching components' low conducting resistance, the ninth embodiment could further improve efficiency.

Operating principal of boost and DC-DC is same as the first embodiment.

Two input rectification circuits charge storage capacitor C2 in the same way as that in the first embodiment.

To charge boost capacitor C1, input AC phase monitoring and rectification control unit 600 monitors AC input voltage and/or phase, controls turn-on and cut off of switching components D3, D4 to realize a full-wave input rectification. D3 or D4 can be designed to be continuously conducted during their half wave conduction interval and there is no switching loss, thus its efficiency performance could possibly be better than bridgeless circuit.

Figure 26:
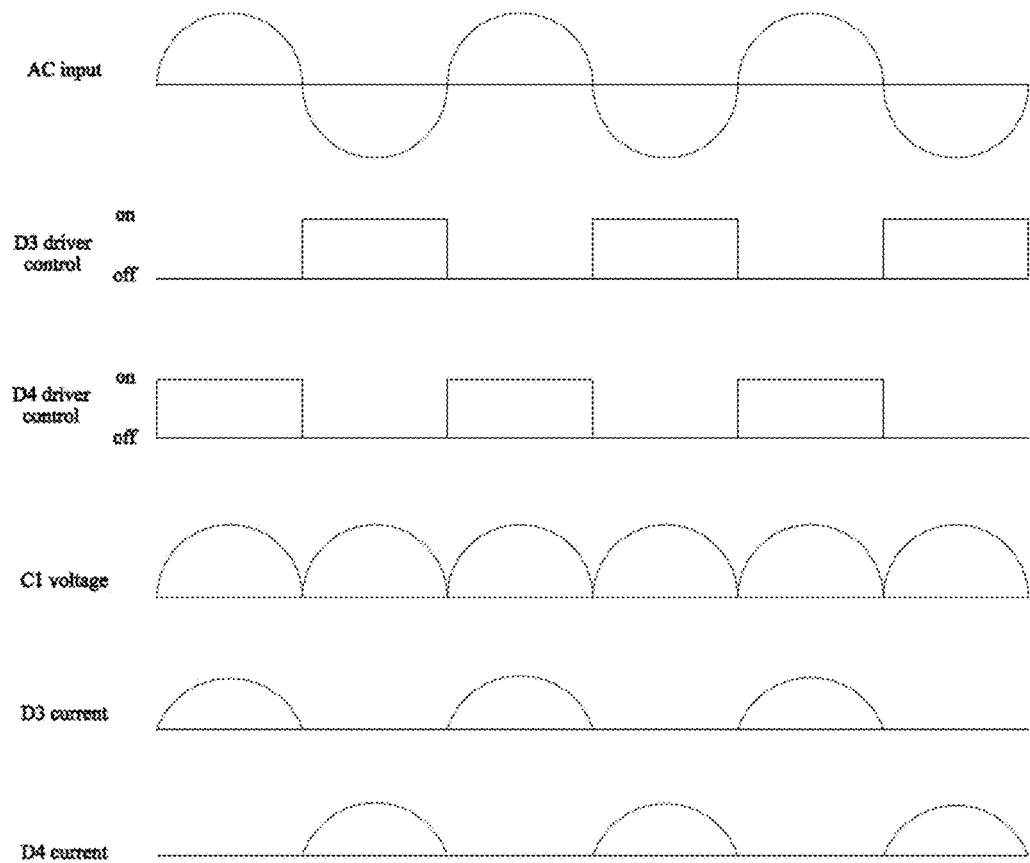
FIG. 26 is an operating waveform diagram of the ninth embodiment.

FIG. 26 shows waveform by using AC phase detection and rectification control unit 600. Setting appropriate and sufficient dead time between switching components D3, D4 could prevent input surge current from input being shorted. The method in this embodiment could be implemented together with any embodiment from the first to the eighth.

Tenth Embodiment

Figure 27:
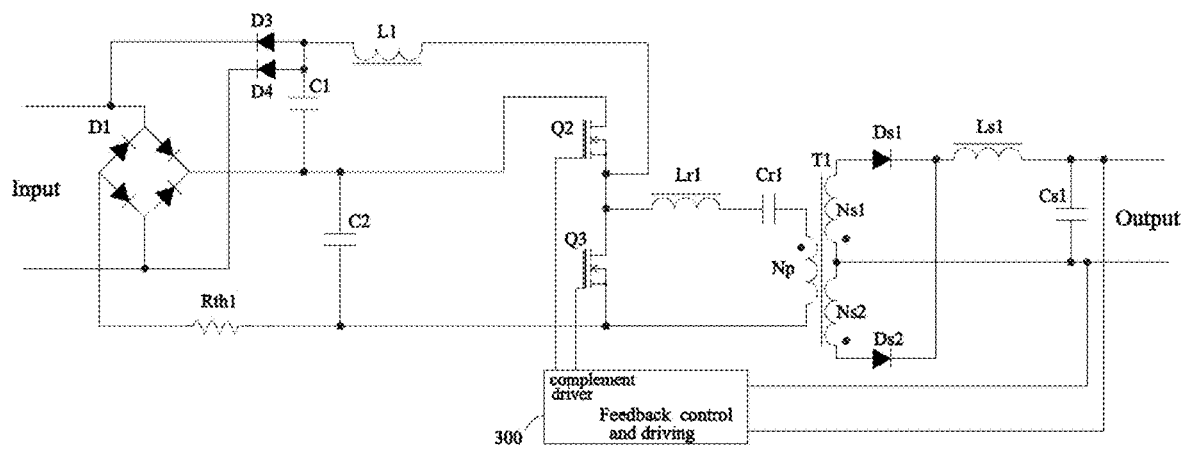
FIG. 27 is a schematic of a tenth embodiment of the present invention.

The tenth embodiment is shown in FIG. 27. In the first input rectification circuit, an inrush current limiter device or circuit Rth1 is inserted to inhibit input surge current at turn on of converter or improve EMC immunity test. Rth1 neither belongs to boost loop, nor belongs to second input rectification loop, nor belongs to DC-DC loop, so it only operates at power converter's turn-on and becomes lossless after converter enters into normal operating. The inrush current limiter could be resistor or capacitor or inductor or active controlled circuit or any combination of above.

Lossless inrush current limiter could be integrated with any embodiment from the first to the ninth.

While the present invention has been shown and described in connection with the embodiments, it will be apparent to those skilled in the art that modifications and variations can be made without departing from the spirit and scopes of the invention as defined by appended claims.

What is claimed is:

1. A dual-rectification bridge type single stage PFC converter circuit, comprising: a first input rectification circuit, a second input rectification circuit, a storage capacitor, a boost converter, a bridge type DC-DC converter, and a feedback control and driving unit, the boost converter comprising a boost capacitor and a boost circuit;

wherein the first input rectification circuit rectifies an input voltage and charges the storage capacitor by forming a first input rectification loop; the second input rectification circuit rectifies the input voltage and charges the boost capacitor by forming a second input rectification loop; one node of the storage capacitor, one node of the boost capacitor and an output of the first input rectification circuit are connected together at a same polarity;

wherein the bridge type DC-DC converter comprises a first bridge arm comprising at least a first switching component and a second switching component;

wherein the bridge type DC-DC converter has a half or a full bridge topology and contains a main transformer, the main transformer including at least one primary winding and at least one secondary winding, the primary winding being driven at least by the first bridge arm, the secondary winding delivering power to an output load through a rectification and filter circuit; or the bridge type DC-DC converter is a BUCK topology and contains a main inductor, the main inductor being driven at least by the first bridge arm and delivering power energy to an output load through a rectification and filter circuit;

wherein the boost circuit comprises a first boost inductor, as well as the first and second switching components of the bridge type DC-DC converter;

wherein during conduction of the first switching component and cut-off of the second switching component, the first boost inductor, the boost capacitor and the first switching component form a first boost loop that charges the first boost inductor by the boost capacitor; during conduction of the second switching component and cut-off of the first switching component, the first boost inductor, the boost capacitor, the second switching component and the storage capacitor form a second boost loop that charges the storage capacitor through a superimposed voltage of an induced voltage on the first boost inductor and a voltage on the boost capacitor;

wherein during conduction of the first switching component and cut-off of the second switching component, the storage capacitor, the primary winding of the main transformer or the main inductor, and the first switching component form a first DC-DC loop; during conduction of the second switching component and cut-off of the first switching component, the primary winding of the main transformer or the main inductor, and the second switching component form a second DC-DC loop;

wherein the feedback control and driving unit senses and feedbacks an output of the bridge type DC-DC converter, generates a chopping signal to control the first and second switching components' conduction and cut-off by comparing with a setting value and according to an automatic control theory, so as to control an output voltage, or current, or power of the bridge type DC-DC converter.

2. The dual-rectification bridge type single stage PFC converter circuit according to claim 1, wherein: the first boost inductor operates at a discontinuous current mode; when the first boost inductor's current is discharged to zero, a resonant loop comprising the storage capacitor, the boost capacitor, the first boost inductor, and the second switching component which is in a turn-on state, generates a resonant current; upon turn-off of the second switching component, the resonant current changes direction to discharge a parasitic capacitor of the first switching component until a zero volt is substantially reached, to enable the first switching component to achieve zero voltage switching (ZVS) at a subsequent turn-on.

3. The dual-rectification bridge type single stage PFC converter circuit according to claim 1, further comprising a first boost rectification component connected in series with the first boost inductor.

4. The dual-rectification bridge type single stage PFC converter circuit according to claim 1, wherein the bridge type DC-DC converter comprises a half bridge circuit or a resonant half bridge circuit containing a resonant inductor and a resonant capacitor.

5. The dual-rectification bridge type single stage PFC converter circuit according to claim 1, wherein the bridge type DC-DC converter comprises:
  a full bridge circuit including a second bridge arm having a third switching component and a fourth switching component and a first boost rectification component connected in series with the first boost inductor, the first boost rectification component being a diode or a switching component
  or
  a resonant full bridge circuit comprising a resonant inductor, a resonant capacitor and a second bridge arm containing a third switching component and a fourth switching component.

6. The dual-rectification bridge type single stage PFC converter circuit according to claim 5, further comprising a second boost inductor connected in series with the second boost rectification component, both of which being driven by the third switching component; wherein the first boost inductor and the second boost inductor are alternately driven by the first switching component and the third switching component to operate like an interleaved boost converter; wherein the second boost rectification component is a diode or a switching component.

7. The dual-rectification bridge type single stage PFC converter circuit according to claim 1, wherein the bridge type DC-DC converter is a BUCK converter, and the second switching component is replaced by a rectification component.

8. The dual-rectification bridge type single stage PFC converter circuit according to claim 1, wherein each of the first input rectification circuit and the second input rectification circuit contains at least a rectification component, the rectification component being either a diode or a switching component;
  when the rectification components are switching components, the PFC converter circuit further includes an input AC phase monitoring and rectification control unit which monitors a phase of an AC input and controls turn-on and turn-off states of the switching components according to the AC phase.

9. The dual-rectification bridge type single stage PFC converter circuit according to claim 1, further comprising an impedance circuit connected in series to the first input rectification loop, to limit an input inrush current upon turn-on of the PFC converter circuit, the impedance circuit not coupled to any of the second input rectification loop, or to the first and second boost loops, or the first and second DC-DC loops.

* * * * *